(12) United States Patent
Gresley

(10) Patent No.: US 7,524,114 B2
(45) Date of Patent: Apr. 28, 2009

(54) RADIAL/AXIAL BEARING

(75) Inventor: Ross A. Gresley, Tega Cay, SC (US)

(73) Assignee: Ina-Schaeffler-KG, Herzogenaurach (DE)

( * ) Notice: Subject to any disclaimer, the term of this patent is extended or adjusted under 35 U.S.C. 154(b) by 230 days.

(21) Appl. No.: 10/558,362

(22) PCT Filed: May 18, 2004

(86) PCT No.: PCT/EP2004/005350

§ 371 (c)(1),
(2), (4) Date: Dec. 21, 2005

(87) PCT Pub. No.: WO2004/106757

PCT Pub. Date: Dec. 9, 2004

(65) Prior Publication Data

US 2007/0009191 A1 Jan. 11, 2007

(30) Foreign Application Priority Data

Feb. 27, 2004 (DE) .................. 10 2004 009 648

(51) Int. Cl.
*F16C 19/14* (2006.01)
*F16C 19/34* (2006.01)

(52) U.S. Cl. ....................... 384/455; 384/452

(58) Field of Classification Search ......... 384/452–455, 384/618–622
See application file for complete search history.

(56) References Cited

U.S. PATENT DOCUMENTS

| | | | | |
|---|---|---|---|---|
| 1,296,827 A | * | 3/1919 | Lyons et al. | 384/454 |
| 2,839,343 A | * | 6/1958 | Bensch | 384/454 |
| 3,167,363 A | * | 1/1965 | Murphy | 384/615 |
| 3,168,359 A | * | 2/1965 | Murphy | 384/454 |
| 3,765,736 A | * | 10/1973 | Pitner | 384/455 |
| 4,109,977 A | * | 8/1978 | Stephan | 384/454 |
| 4,895,461 A | * | 1/1990 | Stella | 384/454 |
| 4,971,460 A | | 11/1990 | Muntnich et al. | |
| 5,829,890 A | | 11/1998 | Bauer et al. | |

FOREIGN PATENT DOCUMENTS

| | | |
|---|---|---|
| DE | 815264 | 11/1964 |
| DE | 6808805 | 11/1968 |
| DE | 6906196 | 2/1969 |
| DE | 2047 421 | 3/1972 |
| DE | 7203282 | 5/1972 |
| DE | 8906246 | 3/1990 |
| DE | 196 25 930 A1 | 8/1998 |
| DE | 200 07 849 U1 | 10/2000 |
| DE | 200 07 849 U1 | 11/2000 |
| EP | 524857 A1 * | 1/1993 |
| FR | 1 377 209 | 10/1964 |
| FR | 2.006.523 | 8/1971 |
| FR | 2 385 936 | 3/1977 |

* cited by examiner

Primary Examiner—Marcus Charles

(57) ABSTRACT

The combined radial/axial bearing has an outer running track formed by a radially inward-pointing rim of the cylindrical sleeve, an inner running track formed by a radially outward-pointing rim of an inner ring and the axes of rotation of the cylindrical rolling bodies in the inner running track intersect with the axes of rotation of the cylindrical rolling bodies in the outer running track virtually at a center of the cylindrical rolling bodies in the outer running track.

9 Claims, 4 Drawing Sheets

RADIAL/AXIAL BEARING

FIELD OF USE OF THE INVENTION

The invention relates to a radial/axial bearing consisting of a radial bearing received in a cylindrical sleeve and having cylindrical rolling bodies and of an axial bearing having cylindrical rolling bodies, said radial bearing and said axial bearing being connected to form a captive structural unit.

BACKGROUND OF THE INVENTION

A combined radial/axial bearing designed generically in this way is previously known from DE-A-20 47 421. The mounting, illustrated in FIG. 2, for the absorption of radial and axial forces consists of a radial needle bearing which is received in a cylindrical sleeve and the rolling bodies of which are held and guided in a cage. Inserted into the cylindrical sleeve on the right side is a first running disk serving as a running track for an axial rolling bearing, the bearing needles of which are guided, in turn, in a cage. The axial bearing includes a further running disk which is connected to the first running disk by flanging. A complete captive structural unit consisting of a radial and an axial bearing is thereby formed.

The disadvantage of this is that, in such a bearing arrangement according to the previous prior art, the arrangement of the radial and the axial bearing in relation to one another necessitates a large radial construction space which is not always available in specific installation situations. The further disadvantage is that such a generically designed bearing is composed of three structural parts of relatively complicated form which have to be connected to one another in a complex way in order to form a captive bearing structural unit.

Another generically designed radial/axial bearing has become known from DE 68 08 805 U. Its outer ring for the needles of the radial bearing according to FIG. 1 which are guided in a cage is provided at one end with a radially inward-directed rim and at the other end merges into a radially outward-running flange which serves as a running disk for the needles of the axial bearing which are guided in the cage and at its end has an axially directed collar. The loose running disk is equipped in the bore with an axially directed collar, on which are provided a plurality of indentations distributed uniformly over the circumference. These indentations engage behind the shoulder of a sheet-metal ring which is inserted into the outer ring and which has at the other end a radially inward-directed rim. The cage is guided axially by means of the two rims, and the loose running disk is held by means of the shoulder, so that the bearing forms a closed structural unit.

The disadvantages mentioned above also apply to this bearing arrangement, that is to say this radial/axial bearing likewise needs a large radial construction space.

SUMMARY OF THE INVENTION

Proceeding from the disadvantages of the previous prior art, therefore, the object on which the invention is based is to provide a compact rolling mounting with a radial roller bearing and with an axial roller bearing, in which rolling mounting a maximum load-bearing capacity is achieved in the radial and in the axial direction, while a predetermined construction space is utilized as favorably as possible.

According to the invention, this object is achieved, in that an outer running track of the axial bearing is formed by a radially inward-pointing rim of the cylindrical sleeve, said rim adjoining an axially outward-projecting cylindrical portion of the sleeve, while an inner running track of the axial bearing is formed by a radially outward-pointing rim of an inner ring of the radial bearing or by a running disk, prolongations of axes of rotation of the cylindrical rolling bodies of the radial bearing intersecting with axes of rotation of the cylindrical rolling bodies of the axial bearing at a center of the cylindrical rolling bodies of the axial bearing.

The decisive advantage of the bearing arrangement designed according to the invention is that the simultaneous absorption of radial and axial loads does not have to be at the expense of an enlarged radial construction space. By virtue of the special arrangement and design of the rolling bodies of the radial bearing and of the axial bearing, the combined bearing structural unit is received by the cylindrical sleeve both in the axial and in the radial direction, so that radial and axial forces can be absorbed in a confined space.

A further advantage arises in that the entire bearing arrangement consists of few bearing structural parts which have relatively simple geometric forms and can thereby be produced cost-effectively. This results, as a further advantage, in a substantially simplified assembly of the entire arrangement, which further lowers the production costs of the bearing structural unit.

Further advantageous design variants of the invention are also obtained by one or more of the following items.

The rolling bodies of the radial bearing have a smaller ratio of diameter to length than the rolling bodies of the axial bearing.

The rolling bodies of the radial bearing are designed as needles with a ratio of diameter to length of 1:2.5 to 1:10.

The radially inward-pointing rim of the cylindrical sleeve is provided with an axially inward-pointing flange. This ensures that the rolling bodies of the axial bearing cannot fall out inwardly in the radial direction in the absence of a bearing cage.

The rolling bodies of the radial bearing and the rolling bodies of the axial bearing are guided in each case in a cage.

The cylindrical sleeve and the inner ring to be produced by means of a noncutting shaping operation. The respective components of the overall bearing arrangement can thus be produced cost-effectively.

The invention is explained in more detail by means of the following exemplary embodiments.

DETAILED DESCRIPTION OF THE DRAWINGS

Figure 1:
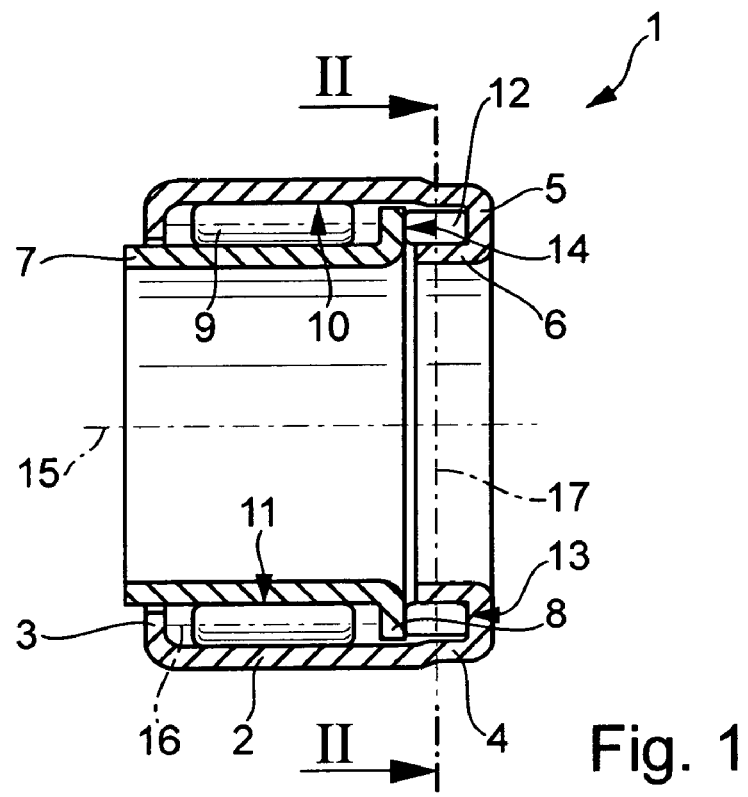
FIG. 1 illustrates a longitudinal view of the radial/axial bearing of the present invention.
Figure 2:
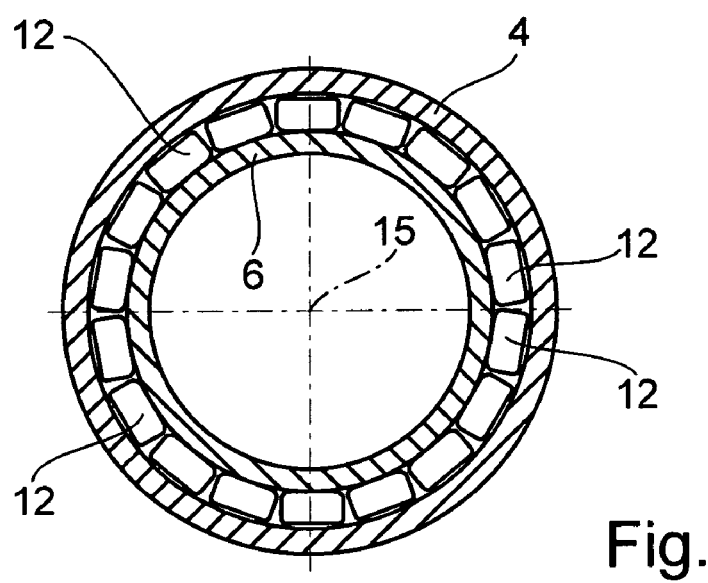
FIG. 2 illustrates the bearing of FIG. 1 along lines II-II of FIG. 1.

The full-roller radial/axial bearing, illustrated in FIGS. 1 and 2, designated by 1 and rotating about a bearing axis 15, is composed of the cylindrical sleeve 2 and of the inner ring 7 which overlap one another in the axial direction and are both produced by means of a noncutting shaping operation. The bearing arrangement 1 includes, further, the axially oriented rolling bodies 9, designed as bearing needles, for the absorption of radial forces and the radially oriented rolling bodies 12 for the absorption of axial forces. As can also be seen, the cylindrical sleeve 2 merges at its left end into the radially inward-directed rim 3, while it is continued on the right side by the cylindrical portion 4, the diameter of which is slightly smaller than the diameter of the remaining cylindrical sleeve 2. This cylindrical region 4 merges into the radially inward-directed rim 5, which is continued, in turn, by the axially inward-directed flange 6, the inside diameter of the latter being slightly larger than the inside diameter of the inner ring 7. This ensures that, with a cylindrical sleeve pressed in a housing, not illustrated, a shaft received by the inner ring 7 and likewise not illustrated is not in contact with the permanently pressed-in sleeve 2. The inner ring 7 is provided at its end on the right side with the radially outward-directed rim 8, for the rolling bodies 9 of the radial bearing the outer running track 10 being formed by the cylindrical sleeve 2 and the inner running track 11 being formed by the inner ring 7. The outer running track 13 of the cylindrical rolling bodies 12 of the axial bearing is formed by the rim 5 of the cylindrical sleeve 2, while the inner running track 14 is formed by the rim 8 of the inner ring.

As FIG. 1 also shows, the cylindrical rolling bodies 9 of the radial bearing which are designed as bearing needles have a ratio of diameter to length of about 1:4, while the cylindrical rolling bodies 12 of the axial bearing have a ratio of about 1:0.6. Within the meaning of the invention, a pellet-shaped design of the cylindrical rolling bodies 12 may be referred to in this respect. It can also be seen that the radial extent of the cylindrical rolling bodies 12 of the axial bearing is slightly smaller than the radial extent of the rolling bodies 9 of the radial bearing, that is to say is slightly smaller than their diameter. The radial extent of the cylindrical rolling bodies 12 of the radial bearing is in this case governed by the diameter of the cylindrical rolling bodies 9 of the radial bearing. The larger their diameter is, the thicker the rolling bodies 12 may also be, as seen in the direction of their axis of rotation 17. The prolongations of the horizontally running axes of rotation 16 of the cylindrical rolling bodies 9 of the radial bearing intersect the vertically running axes of rotation 17 of the cylindrical rolling bodies 12 of the axial bearing at the center or virtually at the center of the rolling bodies 12. This ensures that, on the one hand, no additional radial construction space is required and, on the other hand, relatively high axial loads can be transmitted. Cylindrical rolling bodies 12 with a large ratio of diameter to axial length make it possible for the combined bearing to absorb the axial loads in a construction space which is virtually the same size as the radial bearing itself. Moreover, it is advantageous to use rollers 12 in pellet form for the absorption of axial loads, because their increase in diameter has a greater effect on the dynamic load-bearing capacity than their longitudinal extent.

Figure 3:
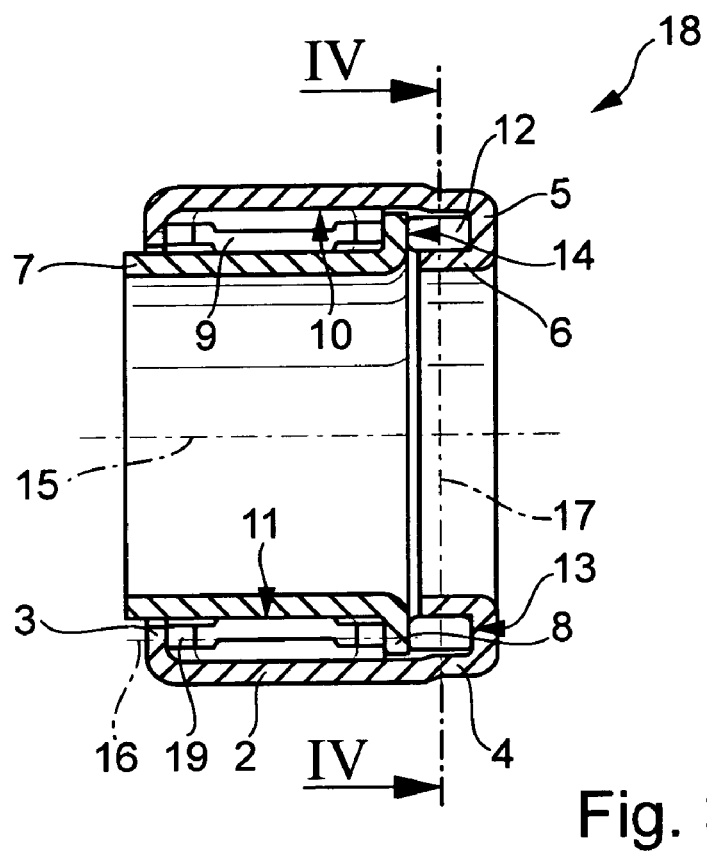
FIG. 3 illustrates a longitudinal view of the radial/axial bearing of the present invention having a cage for the radial bearing.
Figure 4:
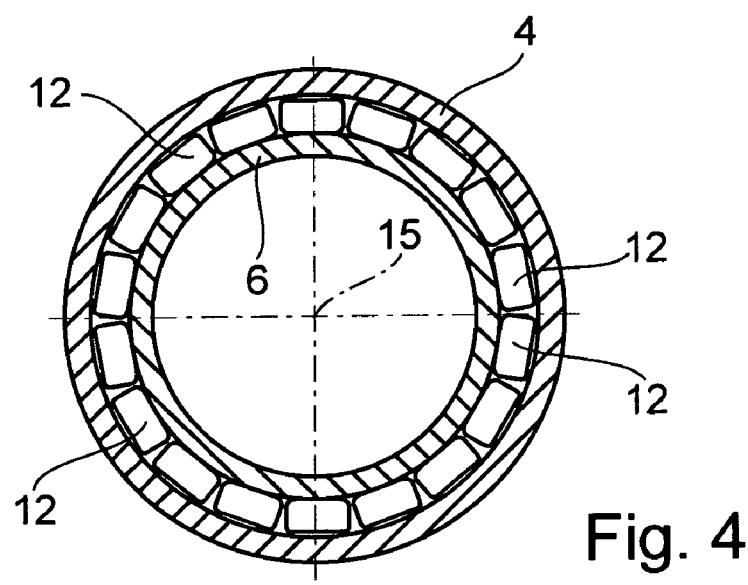
FIG. 4 illustrates the bearing of FIG. 3 along lines IV-IV of FIG. 3.

The radial/axial bearing 18 illustrated in FIGS. 3 and 4 differs from the bearing 1 shown in FIGS. 1 and 2 merely in that the cylindrical rolling bodies 9 of the radial bearing are guided in a cage 19.

Figure 5:
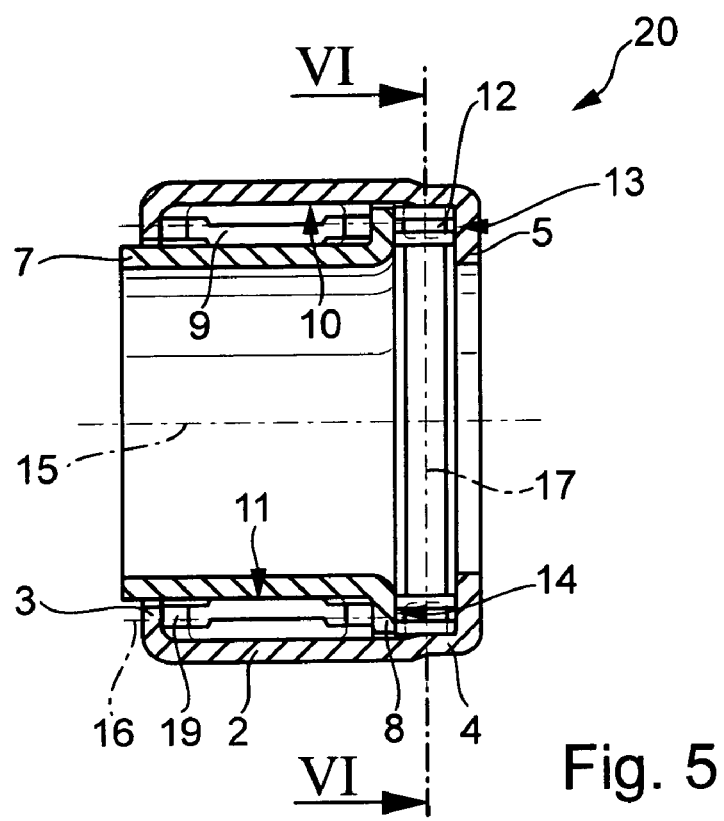
FIG. 5 illustrates a longitudinal view of the radial/axial bearing of the present invention having a cage for both the radial bearing and the axial bearing.
Figure 6:
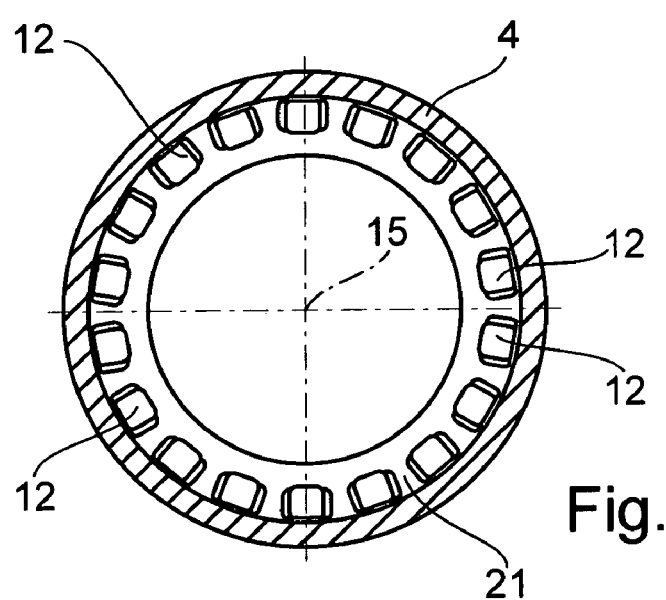
FIG. 6 illustrates the bearing of FIG. 5 along lines VI-VI of FIG. 5.

The radial/axial bearing 20 shown in FIGS. 5 and 6 has, as compared with the bearing 18 shown in FIGS. 3 and 4, an additional cage 21 in which the cylindrical rolling bodies 12 of the axial bearing are held. In this embodiment, the flange 6 of the cylindrical sleeve 2 may be dispensed with.

Figure 7:
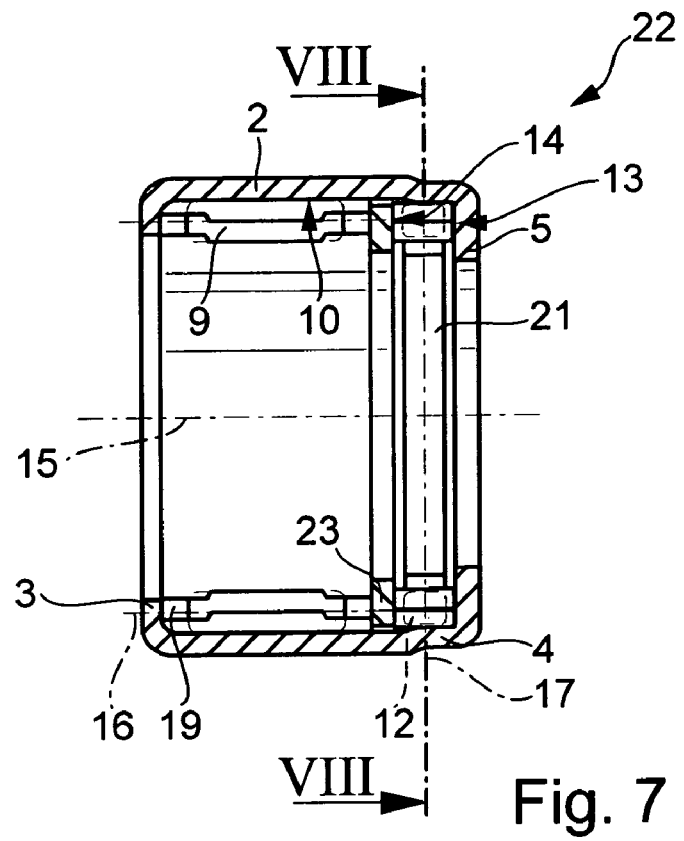
FIG. 7 illustrates a longitudinal view of the radial/axial bearing of the present invention having cages for both the radial and the axial bearing and having a disk acting as the inner running track of the axial bearing.
Figure 8:
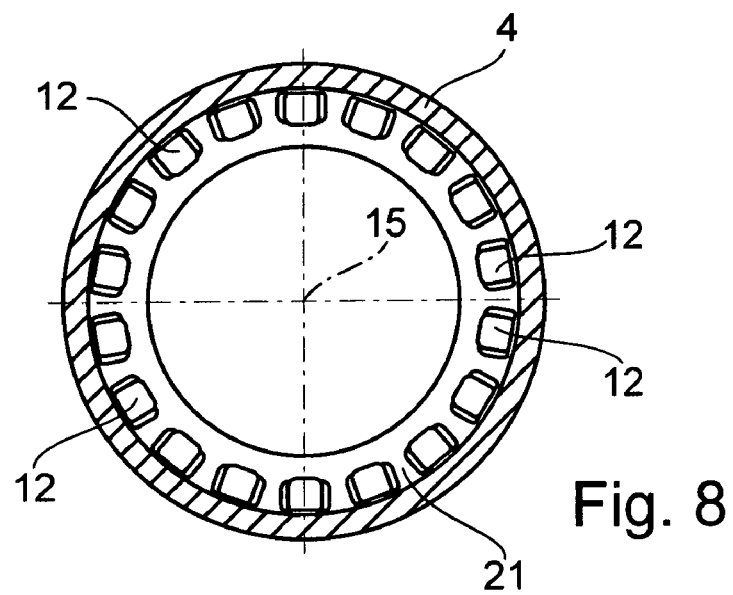
FIG. 8 illustrates the bearing of FIG. 7 along lines VIII-VIII of FIG. 7.

Finally, FIGS. 7 and 8 show a radial/axial bearing 22, in which the inner running track 14 of the cylindrical rolling bodies 12 of the axial bearing is formed by the running disk 23.

REFERENCE SYMBOLS

1 Radial/axial bearing
2 Cylindrical sleeve
3 Rim
4 Cylindrical portion
5 Rim
6 Flange
7 Inner ring
8 Rim
9 Cylindrical rolling body
10 Outer running track
11 Inner running track
12 Cylindrical rolling body
13 Outer running track
14 Inner running track
15 Bearing axis
16 Axis of rotation
17 Axis of rotation
18 Radial/axial bearing
19 Cage
20 Radial/axial bearing
21 Cage
22 Radial/axial bearing
23 Running disk

The invention claimed is:

1. A radial/axial bearing comprising:
   a radial bearing received in a cylindrical sleeve, having cylindrical rolling bodies positioned between the cylindrical sleeve and an inner ring; and
   an axial bearing having cylindrical rolling bodies, said radial bearing and said axial bearing being connected to form a captive structural unit and arranged axially one beside the other substantially in one plane, wherein
   an outer running track of the axial bearing formed by a first radially inward-pointing rim at one end of the cylindrical sleeve, said first rim adjoining an axially outward-projecting cylindrical portion of the sleeve, which is smaller than the diameter of the cylindrical sleeve;
   an inner running track of the axial bearing formed by a radially outward-pointing rim of the inner ring of the radial bearing, such that the axes of rotation of the cylindrical rolling bodies of the radial bearing intersects the axes of rotation of the cylindrical rolling bodies of the axial bearing at a center of the cylindrical rolling bodies of the axial bearing;
   a second radially inward pointing rim at the other end of the cylindrical sleeve, such that said cylindrical sleeve with said first rim and said second rim form the outside of the captive structural unit.

2. The radial/axial bearing as claimed in claim 1, wherein the rolling bodies of the radial bearing have a smaller ratio of diameter to length than the rolling bodies of the axial bearing.

3. The radial/axial bearing as claimed in claim 1, wherein the rolling bodies of the radial bearing are designed as needles with a ratio of diameter to length of 1:2.5 to 1:10.

4. The radial/axial bearing as claimed in claim 1, wherein the first radially inward-pointing rim of the cylindrical sleeve is provided with an axially inward-pointing flange.

5. The radial/axial bearing as claimed in claim 4, wherein diameter of the axially inward-pointing flange is larger than the inside diameter of the inner ring.

6. The radial/axial bearing as claimed in claim 1, wherein the rolling bodies of the radial bearing are guided in a cage.

7. The radial/axial bearing as claimed in claim 1, wherein the rolling bodies of the axial bearing are guided in a cage.

8. The radial/axial bearing as claimed in claim 1, wherein the cylindrical sleeve and the inner ring are produced by means of a noncutting shaping operation.

9. The radial/axial bearing as claimed in claim 1, wherein the radial extent of the cylindrical rolling bodies of the axial bearing is smaller than the radial extent of the cylindrical rolling bodies of the radial bearing.

* * * * *